United States Patent

Padula

Patent Number: 5,293,866
Date of Patent: Mar. 15, 1994

[54] OXYGEN FLOW METER INDICATOR

[75] Inventor: Joseph Padula, Bradley Beach, N.J.

[73] Assignee: David Ellis, Toms River, N.J.

[21] Appl. No.: 881,596

[22] Filed: May 12, 1992

[51] Int. Cl.$^5$ .............................. A61M 16/00
[52] U.S. Cl. .................. 128/204.18; 128/205.23
[58] Field of Search .............. 128/716, 725, 205.23, 128/202.22, 204.23, 204.18; 116/281, 321, 323, 324, 327, DIG. 23

[56] References Cited

U.S. PATENT DOCUMENTS

| | | | |
|---|---|---|---|
| 432,773 | 7/1890 | Smith | 116/324 |
| 956,175 | 4/1910 | Rieckhoff | 116/324 |
| 1,355,697 | 10/1920 | Roth | 116/323 |
| 1,636,752 | 7/1927 | Mitchell | 116/323 |
| 4,183,361 | 1/1980 | Russo | 128/725 |
| 4,231,375 | 11/1980 | Boehringer et al. | 128/725 |
| 4,347,853 | 9/1982 | Gereg et al. | 128/725 |
| 4,495,944 | 1/1985 | Brisson et al. | 128/725 |
| 4,635,647 | 1/1987 | Choksi | 128/725 |
| 4,809,706 | 3/1989 | Watson et al. | 128/725 |

Primary Examiner—Edgar S. Burr
Assistant Examiner—Aaron J. Lewis
Attorney, Agent, or Firm—Caesar, Rivise, Bernstein, Cohen & Pokotilow, Ltd.

[57] ABSTRACT

An indicator device which can be attached to a standard oxygen flow meter is disclosed. The indicator device has a rod along which a pointer can be moved and locked into position. The pointer can be set at the oxygen flow level prescribed by the physician as indicated by the scale on the oxygen flow meter. If the oxygen flow level is changed or if oxygen is discontinued for any period of time, the attendant can then set the oxygen flow to the prescribed level by controlling the valve on the oxygen flow meter so that the float, which indicates oxygen flowing liters per minute is positioned opposite the position of the pointer. This prevents erroneous or improper setting of oxygen flow levels to patients after interruption or change of oxygen flow level, which can be dangerous and life threatening.

11 Claims, 1 Drawing Sheet

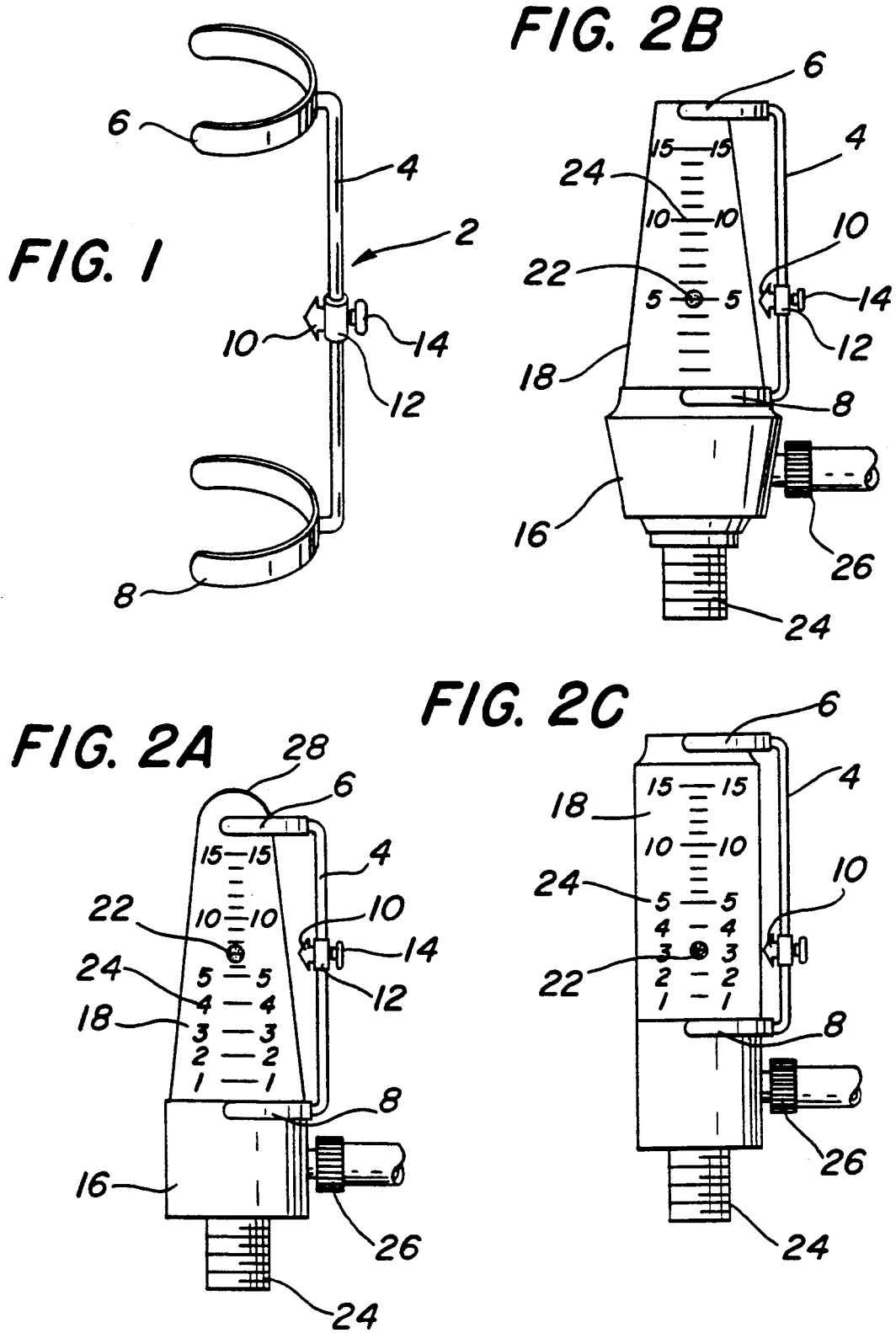

OXYGEN FLOW METER INDICATOR

FIELD OF THE INVENTION

The present invention relates to indicators for fluid flow meters, and more particularly to an indicator device which may be applied to standard oxygen flow meters in present use.

Oxygen flow meters are usually wall mounted in hospitals and institutions near a source of oxygen. They have an input from the source of oxygen, a transparent section and a float inside the section A valve on the oxygen flow meter controls the level of flow of oxygen into the meter. The level of oxygen flow into the flow meter is shown by the float which rises with greater oxygen flow. The position of the float as shown by a scale imprinted on the transparent section of the oxygen flow meter gives the level of oxygen flow. Oxygen flow meters usually allow for the flow of oxygen to be from 0 to 15 liters per minute. The output of the flow meter is connected to a person by a tube, usually feeding oxygen to a nasal applicator.

Usually, the amount of oxygen flow is prescribed by a physician. However, oxygen is often disconnected when the person receiving the oxygen has to be moved or when certain tests are given to the person. The attending nurse or other attendant then reapplies the oxygen to the patient. At times, the attending individual does not know the proper setting prescribed by the physician when reapplying the oxygen. Therefore, in many hospitals and institutions, in the absence of actual knowledge, a standard amount of oxygen such as two liters per minute is often set.

Since the amount of oxygen to be provided to the person can vary depending on the needs and lung capacity of the person, a standard setting can be too high or too low. If the setting is too high, there is a danger that abolition of hypoxic drive can occur which can cause the patient to stop breathing. If the setting is too low for the patient, a life threatening hypoxemia resulting in asphyxiation can occur.

In addition to disconnection of oxygen from the patient, the amount of oxygen flow is sometimes changed to drive nebulized therapy. Thus, in present oxygenation systems, there is no means for insuring that the attendant will reset the oxygen to the prescribed oxygen flow level after the oxygen flow has been changed or disconnected for a period of time.

OBJECTS OF THE INVENTION

Accordingly, it is the general object of this invention to provide an indicator device which will enable attendants in hospitals and institutions to correctly reset the level of oxygen flow to patients after the flow has been modified or disconnected.

It is a further object of this invention to provide an indicator device which can be used with standard oxygen flow meters.

It is yet a further object of this invention to provide an indicator device which can be snapped onto a standard oxygen flow meter to show the oxygen flow level which should be applied to the patient.

It is still yet a further object of the instant invention to provide an indicator device which has a slidable pointer which shows the correct prescribed setting of oxygen flow level to a patient.

It is another object of this invention to provide an indicator device with a rod and a pointer mounted on an annular ring surrounding the rod which can be moved longitudinally along the rod to a pre-determined level of oxygen flow.

It is still another object of this invention to provide an indicator device with a pointer held in position by the frictional engagement between a rod and an annual ring attached to the pointer.

It is yet still another object of this invention to provide an indicator device with a pointer held in position using a wing bolt which locks the pointer into position.

SUMMARY OF THE INVENTION

These and other objects of this invention are achieved by providing an indicator device which can be mounted on an oxygen flow meter for controlling the level of oxygen flow to a patient. The device has a stationary rod along which a pointer may be slid to a position adjacent to the desired oxygen level shown on the scale of the oxygen meter.

When the flow of oxygen to the patient is interrupted, i.e., when movement of the patient is required, or when the level of oxygen is changed for a special purpose such as the application of nebulized medication, the attendant, in reapplying the oxygen flow to the patient, adjusts the valve on the oxygen flow meter so that the float is positioned opposite the pointer. This prevents errors in setting the oxygen flow to the patient. In many case a standardized value of oxygen flow is used when the level is not known by the attendant, which can result in dangerous or life threatening situations when the patient receives too much or too little oxygen.

DESCRIPTION OF THE DRAWING

Other objects and many of the intended advantages of this invention will be readily appreciated when the same becomes better understood by reference to the following detailed description when considered in connection with the accompanying drawing wherein:

FIG. 1 is an isometric view of the indicator device.

FIGS. 2A, 2B, and 2C are isometric views of the indicator device shown clamped to standard oxygen flow meters of different configurations.

DETAILED DESCRIPTION OF THE PREFERRED EMBODIMENT

Referring now in greater detail to the various figures of the drawing, wherein like references and characters refer to like parts, the indicator device 2 of the instant invention is shown in FIG. 1. The indicator device 2 comprises rod 4 with clamps 6 and 8 at the ends of the rod 4. Clamps 6 and 8 are resilient annular bands which clamp to oxygen flow meters as will be described in detail later. An annular ring 12 is circumferentially mounted on the rod 4 and can be moved longitudinally along rod 4. A pointer 10 is attached to the annular ring 12 and wing bolt 14 is threaded into annular ring 12. Thus, the pointer 10 can be slid vertically along rod 4 to a desired location and the wing bolt 14 rotated, so that the bolt 14 presses against the rod 4, to maintain the pointer at its set position. Alternatively, the annular ring may be sized so that it is in frictional engagement with the rod 4 to maintain the position of the pointer 10 after it is set, or the pointer may be coupled to the rod using a gearing arrangement.

FIG. 2A shows the indicator device 2 attached to oxygen flow meter 16 via the clamps 6 and 8. The clamp 6 is attached to handle 28 of the oxygen flow meter while the clamp 8 is attached to the base of the oxygen flow meter 16. Oxygen flow meter 16 comprises a transparent container 18 and a float 22 within the container 18. Scale 24 is marked in liters per minute on the surface of the container 18.

FIGS. 2B and 2C show the indicator device attached to and operated with other types of readily available standard oxygen flow meters. As can be seen in FIGS. 2B and 2C, a control knob 26 operates a valve which controls the oxygen flow from the oxygen source in the wall of the patient's room. Rotating the knob 26 changes the oxygen flow, causing the float 22 to move vertically within the transparent container 18. The oxygen flow level in liters per minute, shown on the scale 24 at the position of the float indicates the amount of flow. Thus it can be seen in FIG. 2B that the control knob 26 has set the input valve for an oxygen flow of 5 liters per minute and that in FIG. 2C the oxygen flow has been set at 3 liters per minute.

When the oxygen flow level is set by the physician, a nurse or attendant moves the pointer 10 to a position adjacent to the prescribed oxygen flow level and locks the pointer 10 into position using the wing bolt 14. Thus, if the oxygen flow is stopped or changed for whatever reason, for a period of time, the attendant is able to reapply oxygen at the prescribed oxygen flow level. The attendant rotates the control knob 26 to control the flow of oxygen until the float 22 is positioned adjacent to the pointer 10. The indicator device 2 remains on the oxygen flow meter at all times so that the prescribed oxygen flow level is always administered to the patient. In case the prescribed flow level is changed, the attendant moves the pointer 10 to a different setting and locks it into position.

FIGS. 2A, 2B, and 2C show examples of the structures of various types of standard oxygen flow meters in use at hospitals and institutions to date. Other types of oxygen flow meters are also in use. The indicator device 2 can be structurally modified to accommodate other types of flow meters.

An oxygen flow meter indicator has been described which can be attached to standard oxygen flow meters. It assures that when the oxygen flow level is changed or when the oxygen flow is interrupted for whatever reason, the attendant can reapply oxygen at the proper level to the patient by setting the oxygen flow level so that the float of the oxygen flow meter is adjacent to the position of the preset pointer on the indicator device.

Without further elaboration the foregoing will fully illustrate my invention so that others may by applying current or future knowledge readily adapt the same for use under the various conditions of service.

What is claimed is:

1. The combination of an oxygen flow meter and a flow rate indicating device, said flow rate indicating device providing a visual indication of a desired rate of flow of oxygen through said flow meter to a patient, said flow meter having a container with a float therein and being provided with oxygen under pressure from an external source, whereupon said float assumes a position within said container indicative of the rate of flow of oxygen through said container, said flow rate indicating device comprising:
   (a) an elongated rod having an outer surface and a pair of ends and means secured thereto, said clamp means further including a pair of annular band clamps secured adjacent the respective ends of said elongated rod releasably securing said elongated rod to said flow meter along a portion of said container in which said float is located;
   (b) an indicator means slidably mounted on said elongated rod for location at any position therealong so that said indicator means can be aligned with said float irrespective of the position of said float within said container; and
   (c) means on said indicator means for engaging a portion of said outer surface of said elongated rod for selectably retaining said indicator means at any position along said elongated rod, said position corresponding to said desired rate of flow of oxygen.

2. The device of claim 1 wherein said indicator means comprises a pointer and said surface means comprises an annular ring to which said pointer is connected, said ring being circumferentially mounted on, and frictionally engaging said portion of said outer surface of said elongated rod.

3. The device of claim 2, wherein said at least one clamp comprises an open annular band made of resilient material which snaps onto a portion of said oxygen flow meter.

4. The device of claim 2 wherein said clamps comprise open annular bands made of a resilient material which snap onto said container.

5. A sytem for providing oxygen to a patient at a predetermined rate of flow comprising;
   (a) source of oxygen under pressure for delivering said oxygen to said patient;
   (b) an oxygen flow meter comprising an input connected to said source of oxygen, a valve for establishing said predetermined rate of flow of said oxygen through said oxygen flow meter, an output connected to a tube providing said oxygen to said patient, a container having a transparent portion, and a float located within said transparent container and whose position within said container indicates the rate of oxygen flow therethrough,; and
   (c) an indicator device for releasable securement to said oxygen flow meter, said indicator device comprising an elongated rod having an outer surface and a pair of ends, indicator means, retaining mans, and clamp means, said clamp means further including a pair of annular band clamps secured adjacent the respective ends of said elongated rod releasably clamping said elongated rod to said oxygen flow meter so that said elongated rod is disposed adjacent said housing, said indicator means being slidably mounted on said elongated rod for location at any position therealong so that said indicator means can be aligned with said float and retained in that position by said retaining means for indicating said predetermined rate of flow of oxygen.

6. The system of claim 5 wherein said indicator means comprises an annular ring and a pointer attached to said ring, said annular ring being circumferentially disposed about and slidably mounted on said elongated rod.

7. The system of claim 6 wherein said annular ring is sized to frictionally engage said elongated rod.

8. The system of claim 6 additionally comprising a wing bolt threaded into said ring and extending therethrough to retain said indicator means in a set position when said wing bolt is rotated so that said wing bolt presses against said elongated rod.

9. The device of claim 7 wherein said at least one clamp comprises an open annular band made of resilient material which snaps onto a portion of said oxygen flow meter.

10. The device of claim 8 wherein said at least one clamp comprises an open annular band made of resilient material which snaps onto a portion of said oxygen flow meter.

11. A method for providing oxygen at a predetermined rate to a patient comprising the steps of:
(a) providing a source of oxygen under pressure for delivering oxygen to said patient;
(b) connecting an oxygen flow meter having a container with a float located therein whose position is a function of an indicates the rate of flow of oxygen through said flow meter;
(c) providing an indicator device said clamp means further including a pair of annular band clamps secured adjacent the respective ends of said elongated rod, releasably clamping said indicator device to said oxygen flow meter so that said rod extends along said container adjacent said float;
(d) sliding said indicator member along said rod to a position corresponding to a predetermined rate, of oxygen flow and releasably securing said indicator member in said position; and
(e) adjusting the flow of said oxygen through said oxygen flow meter to cause said float to assume the position correspond to the position of said indicator member.

* * * * *